United States Patent
Okamura et al.

(10) Patent No.: US 11,591,489 B2
(45) Date of Patent: Feb. 28, 2023

(54) AQUEOUS INK JET COMPOSITION

(71) Applicant: Seiko Epson Corporation, Tokyo (JP)

(72) Inventors: Hisashi Okamura, Shiojiri (JP); Hiroko Hayashi, Shiojiri (JP); Kenji Kitada, Shiojiri (JP); Yasunari Ikeda, Shiojiri (JP); Hirofumi Hokari, Chino (JP); Shinichi Yamamoto, Matsumoto (JP); Michio Nakamori, Matsumoto (JP); Shigeki Kawada, Shiojiri (JP); Kenta Kikuchi, Suwa (JP); Kazumasa Otsuki, Matsumoto (JP); Seiji Kagami, Chino (JP); Shinichi Naito, Chino (JP)

(73) Assignee: SEIKO EPSON CORPORATION

( * ) Notice: Subject to any disclaimer, the term of this patent is extended or adjusted under 35 U.S.C. 154(b) by 527 days.

(21) Appl. No.: 16/727,048

(22) Filed: Dec. 26, 2019

(65) Prior Publication Data
US 2020/0207999 A1 Jul. 2, 2020

(30) Foreign Application Priority Data
Dec. 27, 2018 (JP) .............................. JP2018-246217

(51) Int. Cl.
  C09D 11/322 (2014.01)
  C09D 11/32 (2014.01)
  C09D 11/101 (2014.01)
  C09D 11/102 (2014.01)
  C08L 39/00 (2006.01)
  C08L 71/02 (2006.01)

(52) U.S. Cl.
  CPC ............ *C09D 11/322* (2013.01); *C08L 39/00* (2013.01); *C08L 71/02* (2013.01); *C08L 2201/54* (2013.01); *C08L 2205/03* (2013.01)

(58) Field of Classification Search
  CPC ............................. C09D 11/32; C09D 11/102
  See application file for complete search history.

(56) References Cited

U.S. PATENT DOCUMENTS

| | | | |
|---|---|---|---|
| 6,508,871 B1 | 1/2003 | Kato et al. | |
| 7,507,283 B2 * | 3/2009 | Akatani | C09D 11/38 |
| | | | 106/31.86 |
| 2005/0237369 A1 | 10/2005 | Kosaka | |
| 2008/0070009 A1 | 3/2008 | Akatani et al. | |
| 2015/0284578 A1 | 10/2015 | Ikeda et al. | |
| 2016/0279965 A1 | 9/2016 | Ikeda et al. | |
| 2018/0265723 A1 | 9/2018 | Kagata et al. | |
| 2019/0092953 A1 * | 3/2019 | Kagata | C09D 11/108 |

FOREIGN PATENT DOCUMENTS

| | | | |
|---|---|---|---|
| CN | 108625188 A | | 10/2018 |
| CN | 108795158 A | * | 11/2018 |
| JP | 2001-192591 A | | 7/2001 |
| JP | 2010-018742 A | | 1/2010 |
| JP | 2014-095009 A | | 5/2014 |
| JP | 2016-044259 A | | 4/2016 |
| JP | 2016-190933 A | | 11/2016 |
| JP | 2016-190936 A | | 11/2016 |
| JP | 2016-190937 A | | 11/2016 |
| JP | 2016190933 A | * | 11/2016 |
| JP | 2018-104490 A | | 7/2018 |
| WO | WO-2005-033221 A1 | | 4/2005 |
| WO | WO-2005-121263 A1 | | 12/2005 |

OTHER PUBLICATIONS

Qin et al., ACS Sustainable Chemical & Engineering, 2015, 3, 3239-3244.*

* cited by examiner

Primary Examiner — Vu A Nguyen
(74) Attorney, Agent, or Firm — Harness, Dickey & Pierce, P.L.C.

(57) ABSTRACT

An aqueous ink jet composition contains: C.I. Disperse Red 364; a material A which is at least one compound selected from the group consisting of a compound represented by the following formula (1), a compound represented by the following formula (2), an ethylene oxide adduct of tristyrylphenol, a derivative of the ethylene oxide adduct of tristyrylphenol, a polyalkylene glycol, and a derivative of the polyalkylene glycol; and an anionic dispersant.

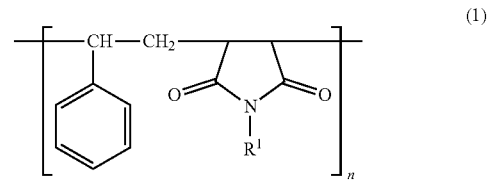

(1)

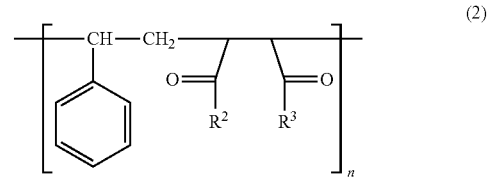

(2)

12 Claims, No Drawings

AQUEOUS INK JET COMPOSITION

The present application is based on, and claims priority from, JP Application Serial Number 2018-246217, filed Dec. 27, 2018, the disclosure of which is hereby incorporated by reference herein in its entirety.

BACKGROUND

1. Technical Field

The present disclosure relates to an aqueous ink jet composition.

2. Related Art

In recent years, the application of ink jet printing has been increased, and besides printing by office and household printers, the ink jet printing is also applied to commercial printing, textile printing, and the like.

In addition, an ink-jet ink containing a disperse dye has also been used.

The ink-jet ink as described above has been used for a direct printing method in which after an ink is applied to a recording medium to be dyed, a dye is fixed by a heat treatment, such as steaming, and for a thermal transfer printing method in which after a dye ink is applied to an intermediate transfer medium, a dye is sublimation-transferred by heating from an intermediate transfer medium side to a recording medium to be dyed.

The ink-jet ink containing a disperse dye has problems in that, in general, due to inferior long-term dispersion stability of a disperse dye, storage stability of the ink is low, and ejection stability thereof by an ink jet method is also inferior.

In order to solve the problems described above, an ink composition described in International Publication No. WO2005/121263 has been proposed.

However, in the ink composition as described above, when a specific disperse dye is contained, a sufficiently excellent storage stability of the ink composition cannot be obtained, and problems of apparent generation of foreign materials during long-term storage and clogging of a head filter and/or a nozzle in ink ejection by an ink jet method may arise. In particular, the present inventor found that when C.I. Disperse Red 364, which is a disperse dye having an excellent red-base coloring property, is used as a disperse dye, the problems as described above become serious. In particular, the present inventor found that in an ink composition containing C.I. Disperse Red 364, foreign materials are liable to be generated at a gas-liquid interface, and as a result, clogging of a head filter and/or a nozzle in ink ejection by an ink jet method is specifically liable to be generated.

SUMMARY

The present disclosure is made to solve the problems described above and can be realized as the following application examples.

An aqueous ink jet composition according to an application example of the present disclosure comprises: C.I. Disperse Red 364; a material A which is at least one compound selected from the group consisting of a compound represented by the following formula (1), a compound represented by the following formula (2), an ethylene oxide adduct of tristyrylphenol, a derivative of the ethylene oxide adduct of tristyrylphenol, a polyalkylene glycol, and a derivative of the polyalkylene glycol; and an anionic dispersant.

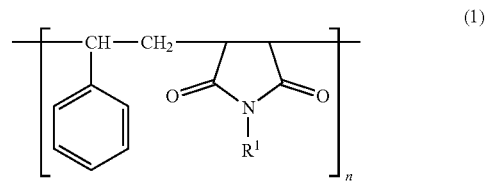

In the formula (1), $R^1$ represents a hydrocarbon group having six carbon atoms or less or $-(CH_2)_m-NR^8R^9$, represents an integer of six or less, and $R^8$ and $R^9$ each independently represent a hydrogen atom or a hydrocarbon group having six carbon atoms or less; and n represents an integer of one or more.

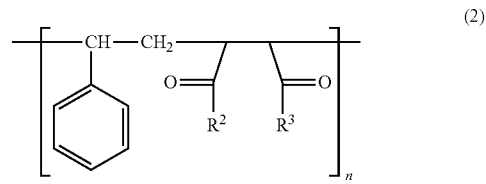

In the formula (2), one of $R^2$ and $R^3$ represents an $-OH$ group, the other represents $-NR^4R^5$, and $R^4$ and $R^5$ each independently represent a hydrogen atom or a hydrocarbon group having six carbon atoms or less; and n represents an integer of one or more.

In addition, in an aqueous ink jet composition according to another application example of the present disclosure, the anionic dispersant may be at least one of a compound represented by the following formula (3), a sodium salt of a naphthalenesulfonic acid formalin condensate and a ligninsulfonic acid.

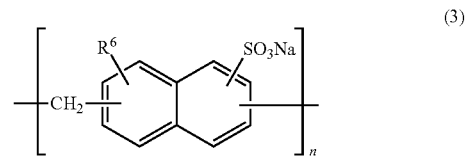

In the formula (3), $R^6$ represents a hydrocarbon group having four carbon atoms or less, and n represents an integer of one or more.

In addition, in an aqueous ink jet composition according to another application example of the present disclosure, the anionic dispersant may further contain a polyoxyethylene alkyl ether sulfate or a polyoxyethylene alkenyl ether sulfate.

In addition, an aqueous ink jet composition according to another application example of the present disclosure may further comprise an indigo compound having a sulfo group.

In addition, in an aqueous ink jet composition according to another application example of the present disclosure, the indigo compound having a sulfo group may be C.I. Acid Blue 76.

In addition, in an aqueous ink jet composition according to another application example of the present disclosure, the content of C.I. Disperse Red 364 may be 0.1 to 30 percent by mass.

In addition, in an aqueous ink jet composition according to another application example of the present disclosure, the content of the material A may be 0.05 to 3.0 percent by mass.

In addition, in an aqueous ink jet composition according to another application example of the present disclosure, the content of the anionic dispersant may be 0.1 to 40 percent by mass.

In addition, in an aqueous ink jet composition according to another application example of the present disclosure, when the contents (percent by mass) of C.I. Disperse Red 364 and the material A are represented by XD and XA, respectively, 0.01≤XA/XD≤1.5 may hold.

In addition, in an aqueous ink jet composition according to another application example of the present disclosure, when the contents (percent by mass) of C.I. Disperse Red 364 and the anionic dispersant are represented by XD and XB, respectively, 0.2≤XB/XD≤2.0 may hold.

In addition, in an aqueous ink jet composition according to another application example of the present disclosure, when the contents (percent by mass) of the material A and the anionic dispersant are represented by XA and XB, respectively, 0.01≤XA/XB≤2.0 may hold.

In addition, in an aqueous ink jet composition according to another application example of the present disclosure, the anionic dispersant may have a weight average molecular weight of 1,000 to 20,000.

In addition, in an aqueous ink jet composition according to another application example of the present disclosure, the material A may contain at least the polyalkylene glycol, and the polyalkylene glycol may have a weight average molecular weight of 1,000 to 20,000.

In addition, an aqueous ink jet composition according to another application example of the present disclosure may be used in an air open-type recording apparatus.

DESCRIPTION OF EXEMPLARY EMBODIMENTS

Hereinafter, preferable embodiments of the present disclosure will be described in detail.
Aqueous Ink Jet Composition Incidentally, among various types of disperse dyes, although having features, such as an excellent coloring property, C.I. Disperse Red 364 has the following problems. That is, when C.I. Disperse Red 364 is used as a constituent element of an aqueous ink jet composition, the aqueous ink jet composition cannot be formed to have a sufficiently excellent storage stability, and hence, heretofore, there have been serious problems of apparent generation of foreign materials due to long-term storage and clogging of a head filter and/or a nozzle in ink ejection by an ink jet method.

Accordingly, in order to provide an aqueous ink jet composition which can effectively prevent the generation of the problems as described above while the features of C.I. Disperse Red 364 are obtained, the present inventor carried out intensive research.

As a result, the present disclosure was finally made.

That is, an aqueous ink jet composition of the present disclosure contains: C.I. Disperse Red 364; a material A which is at least one compound selected from the group consisting of a compound represented by the following formula (1), a compound represented by the following formula (2), an ethylene oxide adduct of tristyrylphenol, a derivative of the ethylene oxide adduct of tristyrylphenol, a polyalkylene glycol, and a derivative of the polyalkylene glycol; and an anionic dispersant.

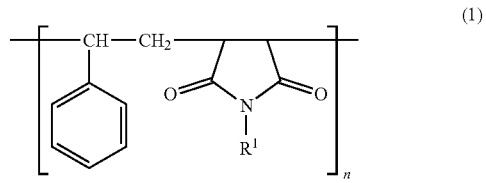

In the formula (1), $R^1$ represents a hydrocarbon group having six carbon atoms or less or $-(CH_2)_m-NR^8R^9$, m represents an integer of six or less, and $R^8$ and $R^9$ each independently represent a hydrogen atom or a hydrocarbon group having six carbon atoms or less; and n represents an integer of one or more.

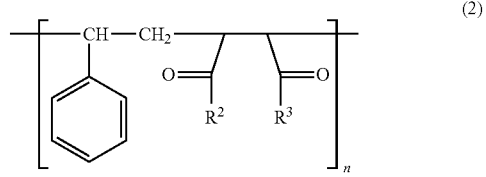

In the formula (2), one of $R^2$ and $R^3$ represents an $-OH$ group, the other represents $-NR^4R^5$, and $R^4$ and $R^5$ each independently represent a hydrogen atom or a hydrocarbon group having six carbon atoms or less; and n represents an integer of one or more.

By the structure as described above, while an effect of including C.I. Disperse Red 364, which is a disperse dye, having features, such as an excellent coloring property in a low-temperature process, is obtained, an aqueous ink jet composition in which apparent generation of foreign materials due to the long-term storage and clogging of a head filter and/or a nozzle in ink ejection by an ink jet method are not likely to be generated can be provided.

On the other hand, when the conditions as described above are not fulfilled, a satisfactory result cannot be obtained. For example, when the material A is not used, the dispersion stability of C.I. Disperse Red 364 in an aqueous ink jet composition cannot be secured, and foreign materials are liable to be generated, for example, during the long-term storage of the aqueous ink jet composition.

In addition, when the anionic dispersant is not used, or when another dispersant, such as a nonionic dispersant or a cationic dispersant, is used instead of using the anionic dispersant, the dispersion stability of C.I. Disperse Red 364 in an aqueous ink jet composition cannot be secured, and foreign materials are liable to be generated, for example, during the long-term storage of the aqueous ink jet composition.

In addition, in this specification, the aqueous ink jet composition is a concept including, besides an ink itself to be ejected by an ink jet method, a stock solution to be used for preparation of the ink. In other words, the aqueous ink jet composition of the present disclosure may be a composition to be ejected by an ink jet method without any treatment or a composition to be ejected by an ink jet method after a treatment, such as a dilution treatment, is performed. In addition, in this specification, the aqueous ink jet composition is a composition containing at least water as a primary volatile liquid component, and the rate of the water in the volatile liquid component forming the aqueous ink jet composition is preferably 40 percent by mass or more, more preferably 50 percent by mass or more and further preferably 70 percent by mass or more.

Material A

The aqueous ink jet composition of the present disclosure contains the material A which is at least one compound selected from the group consisting of the compound represented by the above formula (1), the compound represented by the above formula (2), the ethylene oxide adduct of tristyrylphenol, the derivative of the ethylene oxide adduct of tristyrylphenol, the polyalkylene glycol, and the derivative of the polyalkylene glycol.

When being used in combination with C.I. Disperse Red 364 and the anionic dispersant, the material A is able to improve the dispersion stability of C.I. Disperse Red 364 in the aqueous ink jet composition and the storage stability of the aqueous ink jet composition, and hence, apparent generation of foreign materials during the long-term storage and clogging of a head filter and/or a nozzle in ink ejection by an ink jet method can be effectively prevented. As a result, the ejection of the aqueous ink jet composition can be stably performed for a long time, and the quality of a recorded matter formed by an ink jet method can be stably improved. In addition, the material A is a component which protects the quality of the recorded matter and sublimation dyeing from being adversely influenced.

As the polyalkylene glycol, for example, there may be mentioned a polyoxyethylene, a polyoxypropylene, or a copolymer thereof.

As the derivative of the polyalkylene glycol, for example, an ether compound of the afore-mentioned polyalkylene glycol may be mentioned.

When the material A forming the aqueous ink jet composition is a material containing at least a polyalkylene glycol, although not particularly limited, the lower limit of the weight average weight molecular weight of the polyalkylene glycol is preferably 1,000, more preferably 5,000, and further preferably 10,000. In addition, when the material A forming the aqueous ink jet composition is a material containing at least a polyalkylene glycol, although not particularly limited, the upper limit of the weight average weight molecular weight of the polyalkylene glycol is preferably 20,000, more preferably 19,000, and further preferably 18,000.

Accordingly, the storage stability of the aqueous ink jet composition is further improved, and the generation of foreign materials, for example, during the long-term storage can be more effectively prevented.

The aqueous ink jet composition of the present disclosure may contain, as the material A, one type of compound or at least two types of compounds. In more particular, for example, the material A may be a mixture of the compound represented by the formula (1) and the compound represented by the formula (2).

Although not particularly limited, the lower limit of the content of the material A in the aqueous ink jet composition is preferably 0.05 percent by mass, more preferably 0.08 percent by mass, and further preferably 0.1 percent by mass. In addition, although not particularly limited, the upper limit of the content of the material A in the aqueous ink jet composition is preferably 3.0 percent by mass, more preferably 2.5 percent by mass, and further preferably 2.0 percent by mass.

Accordingly, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, although not particularly limited, the lower limit of the content of the material A in the ink is preferably 0.05 percent by mass, more preferably 0.08 percent by mass, and further preferably 0.1 percent by mass. In addition, when the aqueous ink jet composition is an ink itself to be ejected by an ink jet method, although not particularly limited, the upper limit of the content of the material A in the ink is preferably 2.0 percent by mass, more preferably 1.8 percent by mass, and further preferably 1.5 percent by mass.

In addition, when the aqueous ink jet composition is a stock solution to be used for preparation of an ink ejected by an ink jet method, although not particularly limited, the lower limit of the content of the material A in the stock solution is preferably 0.1 percent by mass, more preferably 0.2 percent by mass, and further preferably 0.5 percent by mass. In addition, when the aqueous ink jet composition is a stock solution to be used for preparation of an ink ejected by an ink jet method, although not particularly limited, the upper limit of the content of the material A in the stock solution is preferably 3.0 percent by mass, more preferably 2.5 percent by mass, and further preferably 2.0 percent by mass.

In addition, when the material A forming the aqueous ink jet composition contains at least two types of compounds, as the content thereof, the sum of the contents of the at least two types of compounds is to be used.

Anionic Dispersant

The aqueous ink jet composition of the present disclosure contains the anionic dispersant.

Although the anionic dispersant is not particularly limited as long as being ionized into an anion, at least one of the compound represented by the following formula (3), a sodium salt of a naphthalenesulfonic acid formalin condensate, and a ligninsulfonic acid is preferable.

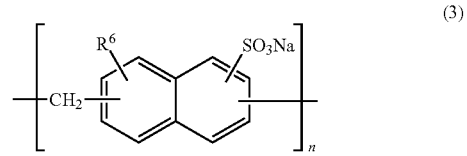

In the formula (3), $R^6$ represents a hydrocarbon group having four carbon atoms or less, and n represents an integer of one or more.

Accordingly, a hydrophobic property of the anionic dispersant is improved, and adsorption of the anionic dispersant to C.I. Disperse Red 364 is promoted, and long-term stability of the aqueous ink jet composition is further improved.

Although $R^6$ in the formula (3) may be a hydrocarbon group having four carbon atoms or less, in particular, a hydrocarbon group having two carbon atoms or less is preferable.

Accordingly, the balance between the hydrophobic property and the hydrophilic property of the anionic dispersant becomes more preferable, and the dispersion stability of C.I. Disperse Red 364 in the aqueous ink jet composition can be further improved.

Although not particularly limited, the lower limit of a weight average molecular weight Mw of the anionic dispersant is preferably 1,000, more preferably 2,000, and further preferably 3,000. In addition, although not particularly limited, the upper limit of the weight average molecular weight Mw of the anionic dispersant is preferably 20,000, more preferably 10,000, and further preferably 5,000.

Accordingly, the storage stability of the aqueous ink jet composition is further improved, and the generation of foreign materials, for example, during the long-term storage can be more effectively prevented.

In addition, the aqueous ink jet composition may contain, as the anionic dispersant, at least two types of compounds.

For example, when the anionic dispersant contains at least one of the compound represented by the above formula (3), the sodium salt of a naphthalenesulfonic acid formalin condensate, and the ligninsulfonic acid, the anionic dispersant may further contain a polyoxyethylene alkyl ether sulfate or a polyoxyethylene alkenyl ether sulfate.

Accordingly, the storage stability of the aqueous ink jet composition is further improved, and the generation of foreign materials, for example, during the long-term storage can be more effectively prevented.

As the polyoxyethylene alkyl ether sulfate, for example, a sodium polyoxyethylene alkyl ether sulfate may be mentioned.

As the polyoxyethylene alkenyl ether sulfate, for example, a sodium polyoxyethylene oleyl ether sulfate may be mentioned.

Although not particularly limited, the lower limit of the content of the anionic dispersant in the aqueous ink jet composition is preferably 0.1 percent by mass, more preferably 0.2 percent by mass, and further preferably 0.3 percent by mass. In addition, although not particularly limited, the upper limit of the content of the anionic dispersant in the aqueous ink jet composition is preferably 40 percent by mass, more preferably 30 percent by mass, and further preferably 20 percent by mass.

Accordingly, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, the lower limit of the content of the anionic dispersant in the ink is preferably 0.1 percent by mass, more preferably 0.2 percent by mass, and further preferably 0.3 percent by mass. In addition, when the aqueous ink jet composition is an ink itself to be ejected by an ink jet method, the upper limit of the content of the anionic dispersant in the ink is preferably 30 percent by mass, more preferably 25 percent by mass, and further preferably 20 percent by mass.

In addition, when the aqueous ink jet composition is a stock solution to be used for preparation of an ink ejected by an ink jet method, the lower limit of the content of the anionic dispersant in the stock solution is preferably 5.0 percent by mass, more preferably 8.0 percent by mass, and further preferably 10.0 percent by mass. In addition, when the aqueous ink jet composition is a stock solution to be used for preparation of an ink ejected by an ink jet method, the upper limit of the content of the anionic dispersant in the stock solution is preferably 40 percent by mass, more preferably 30 percent by mass, and further preferably 20 percent by mass.

In addition, when the anionic dispersant forming the aqueous ink jet composition contains at least two types of compounds, as the content thereof, the sum of the contents of the at least two types of compounds is to be used.

C.I. Disperse Red 364

The aqueous ink jet composition contains, as the disperse dye, C.I. Disperse Red 364.

Although not particularly limited, the lower limit of the average particle diameter of C.I. Disperse Red 364 in the aqueous ink jet composition is preferably 50 nm, more preferably 75 nm, and further preferably 100 nm. In addition, although not particularly limited, the upper limit of the average particle diameter of C.I. Disperse Red 364 in the aqueous ink jet composition is preferably 300 nm, more preferably 250 nm, and further preferably 200 nm.

Accordingly, the storage stability of the aqueous ink jet composition is further improved, and the generation of foreign materials, for example, during the long-term storage can be more effectively prevented. In addition, a recording portion formed using the aqueous ink jet composition can be more effectively sublimated, and the aqueous ink jet composition can be more preferably applied to the sublimation dyeing.

In addition, in this specification, the average particle diameter indicates a volume-based average particle diameter unless otherwise particularly noted. The average particle diameter may be obtained by measurement, for example, using a Microtrac UPA (manufactured by Nikkiso Co., Ltd.).

When the aqueous ink jet composition is an ink itself to be ejected by an ink jet method, although not particularly limited, the lower limit of the content of C.I. Disperse Red 364 in the ink is preferably 0.1 percent by mass, more preferably 2.0 percent by mass, and further preferably 5.0 percent by mass. In addition, when the aqueous ink jet composition is an ink itself to be ejected by an ink jet method, although not particularly limited, the upper limit of the content of C.I. Disperse Red 364 in the ink is preferably 30 percent by mass, more preferably 25 percent by mass, and further preferably 20 percent by mass.

Accordingly, in a recording portion formed using the aqueous ink jet composition, a higher color density can be obtained, and in addition, the storage stability of the aqueous ink jet composition is further improved, and the generation of foreign materials, for example, during the long-term storage can be more effectively prevented.

In the aqueous ink jet composition, when the content of C.I. Disperse Red 364 is represented by XD [percent by mass], and the content of the material A is represented by XA [percent by mass], although not particularly limited, the lower limit of XA/XD is preferably 0.01, more preferably 0.03, and further preferably 0.05. In addition, although not particularly limited, the upper limit of XA/XD is preferably 1.5, more preferably 1.2, and further preferably 1.0.

Accordingly, the storage stability of the aqueous ink jet composition is further improved, and the generation of foreign materials, for example, during the long-term storage can be more effectively prevented.

In the aqueous ink jet composition, when the content of C.I. Disperse Red 364 is represented by XD [percent by mass], and the content of the anionic dispersant is represented by XB [percent by mass], although not particularly limited, the lower limit of XB/XD is preferably 0.2, more preferably 0.4, and further preferably 0.6. In addition, although not particularly limited, the upper limit of XB/XD is preferably 2.0, more preferably 1.5, and further preferably 1.2.

Accordingly, the storage stability of the aqueous ink jet composition is further improved, and the generation of foreign materials, for example, during the long-term storage can be more effectively prevented.

In the aqueous ink jet composition, when the content of the material A is represented by XA [percent by mass], and the content of the anionic dispersant is represented by XB [percent by mass], although not particularly limited, the lower limit of XA/XB is preferably 0.01, more preferably 0.02, and further preferably 0.03. In addition, although not particularly limited, the upper limit of XA/XB is preferably 2.0, more preferably 1.8, and further preferably 1.5.

Accordingly, the storage stability of the aqueous ink jet composition is further improved, and the generation of foreign materials, for example, during the long-term storage can be more effectively prevented.

Water

The aqueous ink jet composition contains water. As this water, for example, purified water, such as reverse osmosis (RO) water, distilled water, or ion-exchanged water, may be used.

Although not particularly limited, the lower limit of the content of the water in the aqueous ink jet composition is preferably 30 percent by mass, more preferably 35 percent by mass, and further preferably 40 percent by mass. In addition, although not particularly limited, the upper limit of the content of the water in the aqueous ink jet composition is preferably 85 percent by mass, more preferably 80 percent by mass, and further preferably 75 percent by mass.

Accordingly, the viscosity of the aqueous ink jet composition can be more reliably controlled at a preferable value, and the ejection stability by an ink jet method can be further improved.

Indigo Compound Having Sulfo Group

The aqueous ink jet composition may contain an indigo compound having a sulfo group.

Accordingly, the storage stability of the aqueous ink jet composition is further improved, and the generation of foreign materials, for example, during the long-term storage can be more effectively prevented. In addition, the indigo compound having a sulfo group is a component which is not likely to adversely influence the sublimation dyeing.

The indigo compound having a sulfo group may be a component which has in its molecule, besides an indigo skeleton, at least one of a sulfo group and a salt thereof.

In addition, in this specification, the indigo skeleton indicates the structure represented by the following formula (6), the structure in which at least one hydrogen atom of the above structure is substituted by another atom or an atom group, or the structure in which a sulfo group is introduced into at least one of the carbonyl groups of the structure described above.

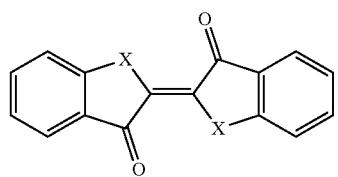

(6)

In the formula (6), two Xs each independently represent S, NH, or CH$_2$.

As a material having an indigo skeleton in which a sulfo group is introduced into at least one of the carbonyl groups, for example, there may be mentioned C.I. Solubilized Vat Blue 1, C.I. Solubilized Vat Orange 5, C.I. Solubilized Vat Red 1, C.I. Solubilized Vat Red 5, C.I. Solubilized Vat Red 6, or C.I. Solubilized Vat Violet 2, C.I. Solubilized Vat Violet 4.

For example, C.I. Solubilized Vat Red 6 has a chemical structure represented by the following formula (7).

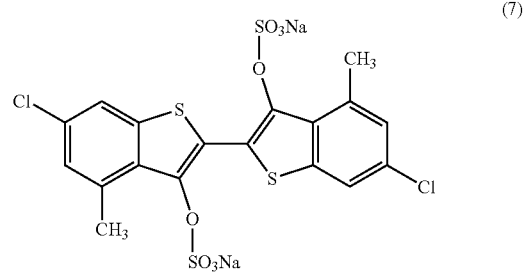

(7)

As described above, although the indigo compound having a sulfo group may be a component which has in its molecule, besides the indigo skeleton, a chemical structure of at least one of a sulfo group and a salt thereof, C.I. Acid Blue 76 is preferable.

Accordingly, the storage stability of the aqueous ink jet composition can be particularly improved.

In addition, C.I. Acid Blue 76 has a chemical structure represented by the following formula (8).

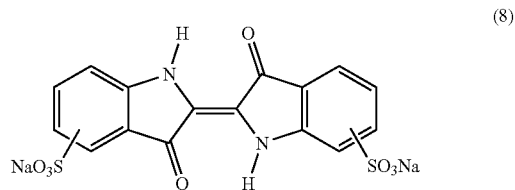

(8)

Although not particularly limited, the lower limit of the content of the indigo compound having a sulfo group in the aqueous ink jet composition is preferably 0.005 percent by mass, more preferably 0.03 percent by mass, and further preferably 0.04 percent by mass. In addition, although not particularly limited, the upper limit of the content of the indigo compound having a sulfo group in the aqueous ink jet composition is preferably 3.0 percent by mass, more preferably 1.5 percent by mass, and further preferably 0.9 percent by mass.

In particular, when the aqueous ink jet composition is an ink itself to be ejected by an ink jet method, the lower limit of the content of the indigo compound having a sulfo group in the ink is preferably 0.005 percent by mass, more preferably 0.03 percent by mass, and further preferably 0.04 percent by mass. In addition, when the aqueous ink jet composition is an ink itself to be ejected by an ink jet method, the upper limit of the content of the indigo compound having a sulfo group in the ink is preferably 1.5 percent by mass, more preferably 1.2 percent by mass, and further preferably 1.0 percent by mass.

In addition, when the aqueous ink jet composition is a stock solution to be used for preparation of an ink ejected by an ink jet method, the lower limit of the content of the indigo compound having a sulfo group in the stock solution is preferably 0.02 percent by mass, more preferably 0.06 percent by mass, and further preferably 0.20 percent by mass. In addition, when the aqueous ink jet composition is a stock solution to be used for preparation of an ink ejected by an ink jet method, the upper limit of the content of the indigo compound having a sulfo group in the stock solution is preferably 3.0 percent by mass, more preferably 1.50 percent by mass, and further preferably 0.90 percent by mass.

In addition, when the indigo compound having a sulfo group, which forms the aqueous ink jet composition, contains at least two types of compounds, as the content thereof, the sum of the contents of the at least two types of compounds is to be used.

Solvent Other than Water

The aqueous ink jet composition may contain a solvent other than the water.

Accordingly, the viscosity of the aqueous ink jet composition can be preferably adjusted, and a moisture-retention property of the aqueous ink jet composition can be improved. As a result, liquid drop ejection by an ink jet method can be more stably performed.

As the solvent other than the water contained in the aqueous ink jet composition, for example, glycerin, propylene glycol, or 2-pyrrolidone may be mentioned.

Since at least one of those solvents is contained, an evaporation rate can be decreased because of an excellent moisture-retention property, and hence, stabler liquid drop ejection can be performed.

Although not particularly limited, the lower limit of the content of the solvent other than the water contained in the aqueous ink jet composition is preferably 1 percent by mass, more preferably 10 percent by mass, and further preferably 15 percent by mass. In addition, although not particularly limited, the upper limit of the content of the solvent other than the water contained in the aqueous ink jet composition is preferably 45 percent by mass, more preferably 43 percent by mass, and further preferably 40 percent by mass.

Accordingly, an effect of including the solvent other than the water can be more significantly obtained.

Surfactant

The aqueous ink jet composition may contain a surfactant.

Accordingly, wettability of the aqueous ink jet composition to a recording medium can be further improved, and hence, a more preferable image quality can be advantageously obtained.

As the surfactant contained in the aqueous ink jet composition, for example, various types of surfactants, such as an anionic surfactant, a cationic surfactant, and a nonionic surfactant, may be used.

In more particular, as the surfactant contained in the aqueous ink jet composition, for example, an acetylene-based surfactant, a silicone-based surfactant, or a fluorine-based surfactant may be mentioned.

When the aqueous ink jet composition contains a silicone-based surfactant, the wettability of the aqueous ink jet composition to a recording medium can be further improved, and a recording portion having a more excellent tone gradation property can be formed.

When the aqueous ink jet composition contains a silicone-based surfactant, although not particularly limited, the lower limit of the content of the silicone-based surfactant in the aqueous ink jet composition is with respect to 100 parts by mass of C.I. Disperse Red 364, preferably 5.0 parts by mass, more preferably 7.0 parts by mass, and further preferably 10 parts by mass. Although not particularly limited, the upper limit of the content of the silicone-based surfactant in the aqueous ink jet composition is with respect to 100 parts by mass of C.I. Disperse Red 364, preferably 150 parts by mass, more preferably 140 parts by mass, and further preferably 70 parts by mass.

Accordingly, an effect of including the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, or BYK-378 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

Other Components

The aqueous ink jet composition may contain at least one component other than the components described above. Hereinafter, the component as described above may also be called other components.

As the other components, for example, there may be mentioned a coloring agent other than C.I. Disperse Red 364; a dispersant other than the anionic dispersant described above; a penetrant, such as triethylene glycol monomethyl ether, triethylene glycol monobutyl ether, diethylene glycol monomethyl ether, 1,2-hexanediol, 1,2-pentandiol, 1,2-butanediol, or 3-methyl-1,5-penetandiol; a pH adjuster, a chelating agent, such as ethylenediaminetetraacetic acid salt, a fungicide/antiseptic agent, and/or a antirust agent. As the fungicide/antiseptic agent, for example, a compound having in its molecule, an isothiazolin cyclic structure may be preferably used.

The content of the other components is preferably 6 percent by mass or less and more preferably 5 percent by mass or less. In addition, as the other components, when at least two types of components are contained, it is preferable that the sum of the contents thereof satisfy the above condition.

In particular, when the aqueous ink jet composition of the present disclosure contains a dispersant other than the anionic dispersant described above, the content of this dispersant is preferably 5 percent by mass or less and more preferably 3 percent by mass or less.

Although not particularly limited, the lower limit of the surface tension of the aqueous ink jet composition at 25° C. is preferably 20 mN/m, more preferably 21 mN/m, and further preferably 23 mN/m. In addition, although not particularly limited, the upper limit of the surface tension of the aqueous ink jet composition at 25° C. is preferably 50 mN/m, more preferably 40 mN/m, and further preferably 30 mN/m.

Accordingly, for example, clogging of a nozzle of an ejection device by an ink jet method is more unlikely to occur, and the ejection stability of the aqueous ink jet composition is further improved. In addition, even if the clogging of a nozzle occurs, when the nozzle is capped, that is, when capping is performed, the recovery property can be further improved.

In addition, as the surface tension, a value measured by Wilhelmy method may be used. For the measurement of the surface tension, for example, a surface tension meter, such as CBVP-7 manufactured by Kyowa Interface Science Co., Ltd., may be used.

Although not particularly limited, the lower limit of the viscosity of the aqueous ink jet composition at 25° C. is preferably 2 mPa·s, more preferably 3 mPa·s, and further preferably 4 mPa·s. In addition, although not particularly limited, the upper limit of the viscosity of the aqueous ink jet composition at 25° C. is preferably 30 mPa·s, more preferably 20 mPa·s, and further preferably 10 mPa·s.

Accordingly, the ejection stability of the aqueous ink jet composition is further improved.

In addition, the viscosity can be measured at 25° C. using a viscoelastic tester, such as MCR-300 manufactured by Pysica, in such a way that the shear rate is increased from 10 [s⁻] to 1,000 [s⁻], and a viscosity at a shear rate of 200 is read.

When the aqueous ink jet composition of the present disclosure is an ink, in general, this ink is received in a container, such as a cartridge, a bag, or a tank, and is then applied to a recording apparatus by an ink jet method. In other words, the recording apparatus according to the present disclosure includes a container, such as an ink cartridge, receiving the aqueous ink jet composition of the present disclosure as an ink.

The aqueous ink jet composition of the present disclosure may be an ink to be ejected by an ink jet method or a stock solution to be used for preparation of the ink, and although a concrete structure of a device which ejects liquid droplets is not limited, the aqueous ink jet composition of the present disclosure is preferably applied to an air open-type recording apparatus and, in more particular, to an ink jet recording apparatus which includes, for example, an ink container having an ink charge port through which an ink can be replenished and a recording head having nozzle holes which eject the ink described above.

In the recording apparatus as described above, when an ink containing C.I. Disperse Red 364 is used, since the ink is in contact with the air, a problem in that foreign materials are particularly liable to be generated at a gas-liquid interface may arise; however, according to the present disclosure, even when the aqueous ink jet composition is applied to the above recording apparatus, the problem as described above can be effectively prevented from being generated. That is, when the aqueous ink jet composition of the present disclosure is applied to an air open-type recording apparatus, the advantage of the present disclosure can be more significantly obtained.

Recording Method

Although the aqueous ink jet composition of the present disclosure may be applied, for example, to a direct printing method or a thermal transfer printing method, such as sublimation dyeing, since C.I. Disperse Red 364 has a sublimation property, the aqueous ink jet composition of the present disclosure can be preferably applied to a thermal transfer printing method.

Hereinafter, as a recording method using the aqueous ink jet composition of the present disclosure, a thermal transfer printing method, and in particular, one example of the sublimation dyeing, will be described.

A recording method of this embodiment includes an ink adhesion step of adhering an aqueous ink jet composition to an intermediate transfer medium by an ink jet method and a transfer step of heating the intermediate transfer medium to which the aqueous ink jet composition is adhered to transfer C.I. Disperse Red 364 contained in the aqueous ink jet composition as a sublimation dye to a recording medium.

Ink Adhesion Step

In the ink adhesion step, by an ink jet method, the aqueous ink jet composition is adhered to the intermediate transfer medium. The ejection of the aqueous ink jet composition by an ink jet method can be performed using a known ink jet recording apparatus. As an ejection method, for example, there may be used a piezoelectric method or a method in which an ink is ejected by bubbles generated by heating the ink. In particular, for example, since deterioration of the aqueous ink jet composition hardly occurs, a piezoelectric method is preferable.

In the ink adhesion step, an ink other than the aqueous ink jet composition according to the present disclosure may also be used in combination.

Intermediate Transfer Medium

As the intermediate transfer medium, for example, paper, such as regular paper, or a recording medium provided with an ink receiving layer may be used, and in more particular, for example, ink jet exclusive paper or a recording medium called coat paper or the like may be used. Among those mentioned above, paper provided with an ink receiving layer formed of inorganic particles, such as silica, is preferable. Accordingly, in a step in which the aqueous ink jet composition adhered to the intermediate transfer medium is dried, an intermediate transfer medium in which, for example, blurring is suppressed can be obtained. In addition, in the following transfer step, the sublimation of C.I. Disperse Red 364 tends to be more smoothly performed.

Transfer Step

Subsequently, the intermediate transfer medium to which the aqueous ink jet composition is adhered is heated, and C.I. Disperse Red 364 used as a constituent element of the aqueous ink jet composition is transferred to the recording medium. As a result, a recorded matter is obtained.

Although not particularly limited, the lower limit of a heating temperature in this step is preferably 160° C. and more preferably 170° C. In addition, although not particularly limited, the upper limit of the heating temperature in this step is preferably 220° C. and more preferably 200° C.

Accordingly, energy required for the transfer can be further decreased, and the productivity of the recorded matter can be further improved. In addition, the coloring property of the recorded matter thus obtained can be further improved.

Although depending on the heating temperature, the lower limit of a heating time in this step is preferably 30 seconds and more preferably 45 seconds. In addition, the upper limit of the heating time is preferably 90 seconds and more preferably 80 seconds.

Accordingly, the energy required for the transfer can be further decreased, and the productivity of the recorded matter can be further improved. In addition, the coloring property of the recorded matter thus obtained can be further improved.

In addition, this step may be performed in such a way that the surface of the intermediate transfer medium to which the aqueous ink jet composition is adhered is heated while being separated from the recording medium by a predetermined distance or while being in close contact with the surface of the recording medium; however, this step is preferably performed in the state in which the surface of the intermediate transfer medium to which the aqueous ink jet composition is adhered is in close contact with the surface of the recording medium.

Accordingly, the energy required for the transfer can be further decreased, and the productivity of the recorded matter can be further improved. In addition, the coloring property of the recorded matter thus obtained can be further improved.

Recording Medium

Although the recording medium is not particularly limited, for example, there may be mentioned a cloth, such as a hydrophobic fiber cloth, a resin film, paper, glass, a metal, or a ceramic. In addition, as the recording medium, a material having a steric shape, such as a sheet shape, a spherical shape, or a rectangular parallelepiped shape, may also be used.

When the recording medium is a cloth, as fibers forming the cloth, for example, there may be mentioned polyester fibers, nylon fibers, triacetate fibers, diacetate fibers, polyamide fibers, or a blend using at least two types of the fibers mentioned above. In addition, there may also be used a blend using the fibers mentioned above with regenerated fibers, such as rayon, or a blend using the fibers mentioned above with natural fibers, such as cotton, silk, or wool.

In addition, when the recording medium is a resin film, as the resin film mentioned above, for example, a polyester film, a polyurethane film, a polycarbonate film, a poly (phenylene sulfide) film, a polyimide film, or a poly(amide imide) film may be mentioned.

In addition, the resin film may be a laminate formed by laminating a plurality of layers or may be a gradient material in which the composition of a material is gradiently changed.

Heretofore, although the preferable embodiments of the present disclosure have been described, the present disclosure is not limited thereto.

For example, the aqueous ink jet composition of the present disclosure may be a composition to be ejected by an ink jet method and may be a composition not applied to the recording method as described above.

For example, the aqueous ink jet composition of the present disclosure may be a composition to be applied to a method including, besides the steps described above, at least one another step.

In the case described above, as a pre-treatment step, for example, a step of applying a coat layer to the recording medium may be mentioned.

In addition, as an intermediate treatment step, for example, a step of pre-heating the recording medium may be mentioned. In addition, as a post-treatment step, for example, a step of washing the recording medium may be mentioned.

In addition, the aqueous ink jet composition of the present disclosure can also be preferably applied to sublimation transfer which uses no intermediate transfer medium. As the sublimation transfer which uses no intermediate transfer medium, for example, there may be mentioned a method including a step of adhering an aqueous ink jet composition by an ink jet method to a strippable ink receiving layer provided on a recording medium; a step of heating the above recording medium which is provided with the ink receiving layer to which the aqueous ink jet composition is adhered so as to perform sublimation diffusion dyeing from the ink receiving layer to the recording medium disposed thereunder; and a step of peeling off the ink receiving layer from the recording medium to obtain a recorded matter.

EXAMPLES

Next, concrete examples of the present disclosure will be described.

1. Preparation of Stock Solution for Ink-Jet Ink Production as Aqueous Ink Jet Composition Example A1

First, C.I. Disperse Red 364 as a disperse dye; NEWPOL PE-108 (weight average molecular weight: 16,000, manufactured by Sanyo Chemical Industries, Ltd.) which was a polyoxyethylene polyoxypropylene block copolymer, that is, a polyalkylene glycol, as the material A; a sodium methylnaphthalenesulfonic acid formalin condensate Na (compound having a —$CH_3$ as $R^6$ of the formula (3)) as the anionic dispersant; and purified water were mixed together at a ratio shown in Table 3, and a mixture thus obtained was stirred at 3,000 rpm by a high shear mixer (manufactured by Silverson) to form a slurry. Subsequently, the slurry thus formed was stirred and dispersed together with glass beads having a diameter of 0.5 mm by a bead mill (LMZ015, manufactured by Ashizawa Finetech Ltd.) in a water cooling atmosphere, so that a stock solution for ink-jet ink production was formed as an aqueous ink jet composition.

The average particle diameter of C.I. Disperse Red 364 in the stock solution for ink-jet ink production was 150 nm.

Examples A2 to A19

Except for that the types of dye, material A, and anionic dispersant and the blending ratio between the components were set as shown in Tables 1, 2, and 3, a stock solution for ink-jet ink production as the aqueous ink jet composition was formed in a manner similar to that of Example A1.

Comparative Examples A1 to A6

Except for that the type of dye, material A, and anionic dispersant and the blending ratio between the components were set as shown in Tables 1, 2, and 3, a stock solution for ink-jet ink production as the aqueous ink jet composition was formed in a manner similar to that of Example A1.

The relationship between the abbreviation and the condition of the material A used for preparation of the stock solution for ink-jet ink production of each of Examples and Comparative Examples is shown in Table 1, the relationship between the abbreviation and the condition of the anionic dispersant is shown in Table 2, and the composition of the stock solution for ink-jet ink production of each of Examples and Comparative Examples is shown in Table 3. In addition, in the tables, A1, A2, and A3, each of which functions as the material A, are each a material represented by the following formula (4); A1 and A2, each of which functions as the material A, are each a material in which $R^7$ of the formula (4) represents H; and A3 which functions as the material A is a material in which $R^7$ of the formula (4) represents $SO_3H$. In addition, in the table, C.I. Disperse Red 364 is represented by "DR364", C.I. Disperse Red 191 is represented by "DR191", C.I. Disperse Red 258 is represented by "DR258", a polycarboxylic acid-based activator (Carrybon L-400, manufactured by Sanyo Chemical Industries, Ltd.) is represented by "A1'", and a polyoxyethylene sorbitan fatty acid ester (Solbon T-40, manufactured by Toho Chemical Industry Co., Ltd.) as a dispersant (nonionic dispersant) other than the anionic dispersant is represented by "B1'". In addition, A4 functioning as the material A used in Example A18 is represented by the following formula (5). In addition, the stock solution for ink-jet ink production of each of Examples A1 to A19 had a viscosity in a range of 2.0 to 30 mPa·s, and the surface tension thereof was in a range of 25 to 60 mN/m. In addition, the viscosity was measured at 25° C. using a viscoelastic tester, such as MCR-300 (manufactured by Pysica), in such a way that the shear rate was increased from 10 [$s^{-1}$] to 1,000 [$s^{-1}$], and a viscosity at a shear rate of 200 was read. In addition, the surface tension was measured at 25° C. by Wilhelmy method using a surface tension meter (CBVP-7, manufactured by Kyowa Interface Science Co., Ltd.).

(4)

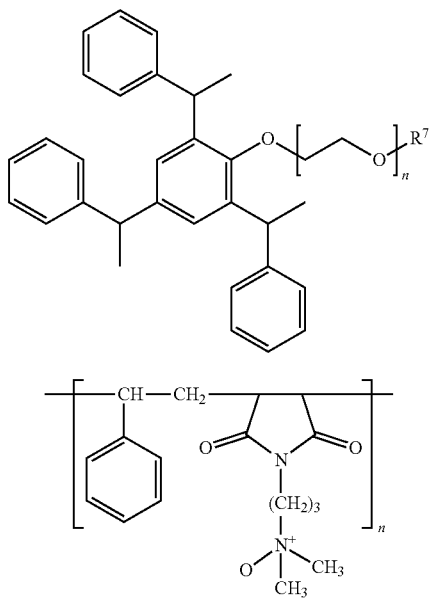

(5)

TABLE 1

| ABBREVIATION OF MATERIAL A | CHEMICAL FORMULA OR PRODUCT NAME | CONDITION OR MATERIAL NAME IN FORMULA |
|---|---|---|
| A1 | FORMULA (4) | $R^7$=H (n = 20) |
| A2 | FORMULA (4) | $R^7$=H (n = 60) |
| A3 | FORMULA (4) | $R^7$=$SO_3H$ |
| A4 | FORMULA (1) (FORMULA (5)) | $R^1$=$(CH_2)_3N^+(CH_3)_2O$— |
| A5 | FORMULA (2) | ONE OF $R^2$ AND $R^3$ IS —OH, AND THE OTHER IS —$N(CH_2)_3N(CH_3)_2O$—. |
| A6 | NEWPOL PE-108 | POLYOXYETHYLENE POLYOXYPROPYLENE BLOCK COPOLYMER (Mw16000) |
| A7 | NEWPOL PE-34 | POLYOXYETHYLENE POLYOXYPROPYLENE BLOCK COPOLYMER (Mw1700) |
| A8 | NEWPOL PE-68 | POLYOXYETHYLENE POLYOXYPROPYLENE BLOCK COPOLYMER (Mw8000) |
| A9 | NIKKOL PBC-34 | POLYOXYETHYLENE POLYOXYPROPYLENE CETYL ETHER |

TABLE 2

| ABBREVIATION OF ANIONIC DISPERSANT | CHEMICAL FORMULA OR MATERIAL NAME | CONDITION IN FORMULA | Mw |
|---|---|---|---|
| B1 | FORMULA (3) | $R^6$=$CH_3$ | 5000 |
| B2 | FORMULA (3) | $R^6$=$CH_2CH_3$ | 5000 |
| B3 | SODIUM POLYOXYETHYLENE ALKYL ETHER SULFATE (LATEMUL E-118B) | — | — |
| B4 | SODIUM POLYOXYETHYLENE OLEYL ETHER SULFATE (LATEMUL WX) | — | — |
| B5 | SODIUM SALT OF NAPHTHALENESULFONIC ACID FORMALIN CONDENSATE | — | 5000 |
| B6 | LIGNINSULFONIC ACID | — | 5000 |

TABLE 3

| | BLENDING AMOUNT (PARTS BY MASS) | | | | | | | | | | | | | | |
|---|---|---|---|---|---|---|---|---|---|---|---|---|---|---|---|
| | DISPERSE DYE | | | MATERIAL A | | | | | | | | | ANIONIC DISPERSANT | | |
| | DR 364 | DR 191 | DR 258 | A1 | A2 | A3 | A4 | A5 | A6 | A7 | A8 | A9 | B1 | B2 | B3 |
| EXAMPLE A1 | 15 | 0 | 0 | 0 | 0 | 0 | 0 | 0 | 1 | 0 | 0 | 0 | 13 | 0 | 0 |
| EXAMPLE A2 | 15 | 0 | 0 | 0 | 0 | 0 | 0 | 0 | 1 | 0 | 0 | 0 | 15 | 0 | 0 |
| EXAMPLE A3 | 30 | 0 | 0 | 1 | 0 | 0 | 0 | 0 | 0 | 0 | 0 | 0 | 0 | 15 | 0 |
| EXAMPLE A4 | 20 | 0 | 0 | 0 | 0 | 0 | 0 | 0 | 0 | 2 | 0 | 0 | 0 | 15 | 0 |
| EXAMPLE A5 | 15 | 0 | 0 | 0 | 0 | 0 | 0 | 0 | 0 | 0 | 1 | 0 | 0 | 0 | 0 |
| EXAMPLE A6 | 15 | 0 | 0 | 0 | 0 | 0 | 0 | 0 | 0 | 0 | 1 | 00 | 0 | 0 | 0 |

TABLE 3-continued

| | | | | | | | | | | | | | | | |
|---|---|---|---|---|---|---|---|---|---|---|---|---|---|---|---|
| EXAMPLE A7 | 15 | 0 | 0 | 0 | 0 | 0 | 0 | 0 | 3 | 0 | 0 | 0 | 0 | 0 | 0 |
| EXAMPLE A8 | 15 | 0 | 0 | 0 | 0 | 0 | 0 | 0 | 2 | 0 | 0 | 0 | 0 | 0 | 0 |
| EXAMPLE A9 | 5 | 0 | 0 | 0 | 7.5 | 0 | 0 | 0 | 0 | 0 | 0 | 0 | 8 | 0 | 2 |
| EXAMPLE A10 | 20 | 0 | 0 | 0 | 0.5 | 0 | 0 | 0 | 0 | 0 | 0 | 0 | 15 | 0 | 0 |
| EXAMPLE A11 | 10 | 0 | 0 | 0 | 1 | 0 | 0 | 0 | 0 | 0 | 0 | 0 | 20 | 0 | 2 |
| EXAMPLE A12 | 20 | 0 | 0 | 0 | 0 | 0 | 0 | 0 | 1 | 0 | 0 | 0 | 5 | 0 | 0 |
| EXAMPLE A13 | 15 | 0 | 0 | 0 | 0 | 0 | 0 | 0 | 0 | 10 | 0 | 0 | 0 | 0 | 0 |
| EXAMPLE A14 | 15 | 0 | 0 | 0.25 | 0 | 0 | 0 | 0 | 0 | 0 | 0 | 0 | 0 | 0 | 0 |
| EXAMPLE A15 | 15 | 0 | 0 | 0 | 0 | 0 | 0 | 0 | 0 | 0 | 0 | 1 | 0 | 15 | 0 |
| EXAMPLE A16 | 15 | 0 | 0 | 0 | 0 | 0 | 0 | 1 | 0 | 0 | 0 | 1 | 0 | 15 | 0 |
| EXAMPLE A17 | 15 | 0 | 0 | 0 | 0 | 1 | 0 | 0 | 0 | 0 | 0 | 0 | 15 | 0 | 0 |
| EXAMPLE A18 | 15 | 0 | 0 | 0 | 0 | 0 | 1 | 0 | 0 | 0 | 0 | 0 | 15 | 0 | 0 |
| EXAMPLE A19 | 15 | 0 | 0 | 0 | 0 | 0 | 0 | 1 | 0 | 0 | 0 | 0 | 15 | 0 | 0 |
| COMPARATIVE EXAMPLE A1 | 0 | 15 | 0 | 0 | 0 | 0 | 0 | 0 | 1 | 0 | 0 | 0 | 15 | 0 | 0 |
| COMPARATIVE EXAMPLE A2 | 0 | 0 | 15 | 0 | 0 | 0 | 0 | 0 | 1 | 0 | 0 | 0 | 15 | 0 | 0 |
| COMPARATIVE EXAMPLE A3 | 15 | 0 | 0 | 0 | 0 | 0 | 0 | 0 | 0 | 0 | 0 | 0 | 0 | 0 | 0 |
| COMPARATIVE EXAMPLE A4 | 15 | 0 | 0 | 0 | 0 | 0 | 0 | 0 | 0 | 0 | 0 | 0 | 0 | 0 | 0 |
| COMPARATIVE EXAMPLE A5 | 15 | 0 | 0 | 0 | 0 | 0 | 0 | 0 | 0 | 0 | 0 | 0 | 0 | 0 | 0 |
| COMPARATIVE EXAMPLE A6 | 15 | 0 | 0 | 0 | 0 | 0 | 0 | 0 | 2 | 0 | 0 | 0 | 0 | 0 | 0 |

| | BLENDING AMOUNT (PARTS BY MASS) | | | | | | | | |
|---|---|---|---|---|---|---|---|---|---|
| | ANIONIC DISPERSANT | | | OTHER COMPONENTS | | PURIFIED | | | |
| | B4 | B5 | B6 | A1' | B1' | WATER | XA/XD | XB/XD | XA/XB |
| EXAMPLE A1 | 2 | 0 | 0 | 0 | 0 | 50 | 0.07 | 1.00 | 0.07 |
| EXAMPLE A2 | 0 | 0 | 0 | 0 | 0 | 50 | 0.07 | 1.00 | 0.07 |
| EXAMPLE A3 | 0 | 0 | 0 | 0 | 0 | 40 | 0.03 | 0.50 | 0.07 |
| EXAMPLE A4 | 0 | 0 | 0 | 0 | 0 | 46.5 | 0.10 | 0.75 | 0.13 |
| EXAMPLE A5 | 0 | 30 | 0 | 0 | 0 | 40 | 0.07 | 2.00 | 0.03 |
| EXAMPLE A6 | 0 | 20 | 0 | 0 | 0 | 47.5 | 0.07 | 1.33 | 0.05 |
| EXAMPLE A7 | 0 | 0 | 15 | 0 | 0 | 45.5 | 0.20 | 1.00 | 0.20 |
| EXAMPLE A8 | 0 | 0 | 15 | 0 | 0 | 46.5 | 0.13 | 1.00 | 0.13 |
| EXAMPLE A9 | 0 | 0 | 0 | 0 | 0 | 48.5 | 1.50 | 2.00 | 0.75 |
| EXAMPLE A10 | 0 | 0 | 0 | 0 | 0 | 48 | 0.03 | 0.75 | 0.03 |
| EXAMPLE A11 | 0 | 0 | 0 | 0 | 0 | 48 | 0.10 | 2.20 | 0.05 |
| EXAMPLE A12 | 0 | 0 | 0 | 0 | 0 | 57.5 | 0.05 | 0.25 | 0.20 |
| EXAMPLE A13 | 1 | 5 | 0 | 0 | 0 | 50 | 0.67 | 0.40 | 1.67 |
| EXAMPLE A14 | 0 | 20 | 0 | 0 | 0 | 50.75 | 0.02 | 1.33 | 0.01 |
| EXAMPLE A15 | 0 | 0 | 0 | 0 | 0 | 50 | 0.07 | 1.00 | 0.07 |
| EXAMPLE A16 | 0 | 0 | 0 | 0 | 0 | 65 | 0.13 | 1.00 | 0.13 |
| EXAMPLE A17 | 0 | 0 | 0 | 0 | 0 | 50 | 0.07 | 1.00 | 0.07 |
| EXAMPLE A18 | 0 | 0 | 0 | 0 | 0 | 50 | 0.07 | 1.00 | 0.07 |
| EXAMPLE A19 | 0 | 0 | 0 | 0 | 0 | 50 | 0.07 | 1.00 | 0.07 |
| COMPARATIVE EXAMPLE A1 | 0 | 0 | 0 | 0 | 0 | 50 | — | — | 0.07 |
| COMPARATIVE EXAMPLE A2 | 0 | 0 | 0 | 0 | 0 | 50 | — | — | 0.07 |
| COMPARATIVE EXAMPLE A3 | 0 | 15 | 0 | 0 | 0 | 51 | 0.00 | 1.00 | 0.00 |
| COMPARATIVE EXAMPLE A4 | 0 | 0 | 0 | 0 | 15 | 51 | 0.00 | 0.00 | — |
| COMPARATIVE EXAMPLE A5 | 0 | 15 | 0 | 1 | 0 | 50 | 0.00 | 1.00 | 0.00 |
| COMPARATIVE EXAMPLE A6 | 0 | 0 | 0 | 0 | 0 | 64 | 0.13 | 0.00 | — |

2. Evaluation of Stock Solution for Ink-Jet Ink Production 2-1. Change in Particle Diameter After the average particle diameter of the disperse dye immediately after the production and the average particle diameter of the disperse dye which was contained in a predetermined container and then left for one week in an environment at 60° C. were obtained from the stock solution for ink-jet ink production of each of Examples and Comparative Examples, from the values thus obtained, the rate of change in the average particle diameter of the disperse dye which was left for one week in an environment at 60° C. to the average particle diameter of the disperse dye immediately after the production was obtained, and evaluation was performed in accordance with the following criteria. In addition, for the measurement of the average particle diameter, a Microtrac UPA (manufactured by Nikkiso Co., Ltd.) was used. It can be said that as the rate of change in the average particle diameter is increased, the storage stability is degraded. C or more was regarded as a preferable level.

A: Rate of change in average particle diameter of less than 5%.

B: Rate of change in average particle diameter of 5% to less than 10%.

C: Rate of change in average particle diameter of 10% to less than 15%.
D: Rate of change in average particle diameter of 15% to less than 20%.
E: Rate of change in average particle diameter of 20% or more.

2-2. Generation of Foreign Materials

The stock solution for ink-jet ink production of each of Examples and Comparative Examples in an amount of 10 mL was received in a predetermined glass bottle so as to form a gas-liquid interface and was then left for five days in an environment at 60° C. Subsequently, after the stock solution for ink-jet ink production was filtrated by a metal mesh filter having an opening diameter of 10 µm, the number of solid materials remaining on the metal mesh filer per square millimeter was counted, and evaluation was performed in accordance with the following criteria. It can be said that as the amount of foreign materials thus generated is increased, the storage stability is degraded. C or more was regarded as a preferable level.

A: The number of solid materials per square millimeter is less than 5.
B: The number of solid materials per square millimeter is 5 to less than 10.
C: The number of solid materials per square millimeter is 10 to less than 30.
D: The number of solid materials per square millimeter is 30 to less than 50.
E: The number of solid materials per square millimeter is 50 or more.

Those results described above are collectively shown in Table 4.

TABLE 4

| | CHANGE IN PARTICLE DIAMETER | GENERATION OF FOREIGN MATERIALS |
|---|---|---|
| EXAMPLE A1 | A | A |
| EXAMPLE A2 | B | A |
| EXAMPLE A3 | C | B |
| EXAMPLE A4 | B | B |
| EXAMPLE A5 | C | B |
| EXAMPLE A6 | C | B |
| EXAMPLE A7 | C | B |
| EXAMPLE A8 | C | B |
| EXAMPLE A9 | C | B |
| EXAMPLE A10 | C | B |
| EXAMPLE A11 | C | B |
| EXAMPLE A12 | C | C |
| EXAMPLE A13 | C | C |
| EXAMPLE A14 | C | B |
| EXAMPLE A15 | B | B |
| EXAMPLE A16 | C | B |
| EXAMPLE A17 | B | B |
| EXAMPLE A18 | C | C |
| EXAMPLE A19 | C | C |
| COMPARATIVE EXAMPLE A1 | E | E |
| COMPARATIVE EXAMPLE A2 | E | E |
| COMPARATIVE EXAMPLE A3 | D | D |
| COMPARATIVE EXAMPLE A4 | E | E |
| COMPARATIVE EXAMPLE A5 | E | D |
| COMPARATIVE EXAMPLE A6 | E | E |

As apparent from Table 4, according to the present disclosure, excellent results are obtained. On the other hand, in Comparative Examples, satisfactory results cannot be obtained.

3. Preparation of Ink-Jet Ink as Aqueous Ink Jet Composition

Example B1

The stock solution for ink-jet ink production prepared in Example A1 described above, glycerin, propylene glycol, BYK348 (manufactured by BYK Japan KK) as a silicone-based surfactant, and water were mixed together at a ratio shown in Table 5, followed by stirring at 3,000 rpm by a high shear mixer (manufactured by Silverson), so that an ink-jet ink as the aqueous ink jet composition was formed.

The average particle diameter of C.I. Disperse Red 364 in the ink-jet ink was 150 nm.

Examples B2 to B19

Except for that as the stock solution for ink-jet ink production, the material prepared in each of Examples A2 to A19 was used, and the blending ratio between the components was set as shown in Table 5, an ink-jet ink as the aqueous ink jet composition was formed in a manner similar to that of Example B1.

Comparative Examples B1 to B6

Except for that as the stock solution for ink-jet ink production, the material prepared in each of Comparative Examples A1 to A6 was used, and the blending ratio between the components was set as shown in Table 5, an ink-jet ink as the aqueous ink jet composition was formed in a manner similar to that of Example B1.

The conditions of the ink-jet ink of each of Examples and Comparative Examples are collectively shown in Table 5. In addition, in the table, glycerin is represented by "Gly", propylene glycol is represented by "PG", BYK348 (manufactured by BYK Japan KK) as a silicone-based surfactant is represented by "BYK348", and Olefin EXP4300 (manufactured by Nisshin Chemical Industry Co., Ltd.) as an acetylene-based surfactant is represented by "EXP4300". In addition, the ink-jet ink of each of Examples B1 to B19 had a viscosity in a range of 2.0 to 10 mPa·s, and the surface tension thereof was in a range of 25 to 35 mN/m. In addition, the viscosity was measured at 25° C. using a viscoelastic tester MCR-300 (manufactured by Pysica), in such a way that the shear rate was increased from 10 $[s^{-1}]$ to 1,000 $[s^{-1}]$, and a viscosity at a shear rate of 200 was read. In addition, the surface tension was measured at 25° C. by Wilhelmy method using a surface tension meter (CBVP-7, manufactured by Kyowa Interface Science Co., Ltd.).

TABLE 5

| | BLENDING AMOUNT (PARTS BY MASS) | | | | | | | | | | | | | | | | | |
|---|---|---|---|---|---|---|---|---|---|---|---|---|---|---|---|---|---|---|
| | DISPERSE DYE | | | MATERIAL A | | | | | | | | | ANIONIC DISPERSANT | | | | | |
| | DR 364 | DR 191 | DR 258 | A1 | A2 | A3 | A4 | A5 | A6 | A7 | A8 | A9 | B1 | B2 | B3 | B4 | B5 | B6 |
| EXAMPLE B1 | 15 | 0 | 0 | 0 | 0 | 0 | 0 | 0 | 1 | 0 | 0 | 0 | 13 | 0 | 0 | 2 | 0 | 0 |
| EXAMPLE B2 | 15 | 0 | 0 | 0 | 0 | 0 | 0 | 0 | 1 | 0 | 0 | 0 | 15 | 0 | 0 | 0 | 0 | 0 |
| EXAMPLE B3 | 30 | 0 | 0 | 1 | 0 | 0 | 0 | 0 | 0 | 0 | 0 | 0 | 0 | 15 | 0 | 0 | 0 | 0 |
| EXAMPLE B4 | 20 | 0 | 0 | 0 | 0 | 0 | 0 | 0 | 0 | 2 | 0 | 0 | 0 | 15 | 0 | 0 | 0 | 0 |
| EXAMPLE B5 | 15 | 0 | 0 | 0 | 0 | 0 | 0 | 0 | 0 | 0 | 1 | 0 | 0 | 0 | 0 | 0 | 30 | 0 |
| EXAMPLE B6 | 15 | 0 | 0 | 0 | 0 | 0 | 0 | 0 | 0 | 0 | 1 | 0 | 0 | 0 | 0 | 0 | 20 | 0 |
| EXAMPLE B7 | 15 | 0 | 0 | 0 | 0 | 0 | 0 | 0 | 3 | 0 | 0 | 0 | 0 | 0 | 0 | 0 | 0 | 15 |
| EXAMPLE B8 | 15 | 0 | 0 | 0 | 0 | 0 | 0 | 0 | 2 | 0 | 0 | 0 | 0 | 0 | 0 | 0 | 0 | 15 |
| EXAMPLE B9 | 5 | 0 | 0 | 0 | 7.5 | 0 | 0 | 0 | 0 | 0 | 0 | 0 | 8 | 0 | 2 | 0 | 0 | 0 |
| EXAMPLE B10 | 20 | 0 | 0 | 0 | 0.5 | 0 | 0 | 0 | 0 | 0 | 0 | 0 | 15 | 0 | 0 | 0 | 0 | 0 |
| EXAMPLE B11 | 10 | 0 | 0 | 0 | 1 | 0 | 0 | 0 | 0 | 0 | 0 | 0 | 20 | 0 | 2 | 0 | 0 | 0 |
| EXAMPLE B12 | 20 | 0 | 0 | 0 | 0 | 0 | 0 | 0 | 1 | 0 | 0 | 0 | 5 | 0 | 0 | 0 | 0 | 0 |
| EXAMPLE B13 | 15 | 0 | 0 | 0 | 0 | 0 | 0 | 0 | 0 | 10 | 0 | 0 | 0 | 0 | 0 | 1 | 5 | 0 |
| EXAMPLE B14 | 15 | 0 | 0 | 0.25 | 0 | 0 | 0 | 0 | 0 | 0 | 0 | 0 | 0 | 0 | 0 | 0 | 20 | 0 |
| EXAMPLE B15 | 15 | 0 | 0 | 0 | 0 | 0 | 0 | 0 | 0 | 0 | 0 | 1 | 0 | 15 | 0 | 0 | 0 | 0 |
| EXAMPLE B16 | 15 | 0 | 0 | 0 | 0 | 0 | 0 | 0 | 1 | 0 | 0 | 1 | 0 | 15 | 0 | 0 | 0 | 0 |
| EXAMPLE B17 | 15 | 0 | 0 | 0 | 0 | 1 | 0 | 0 | 0 | 0 | 0 | 0 | 15 | 0 | 0 | 0 | 0 | 0 |
| EXAMPLE B18 | 15 | 0 | 0 | 0 | 0 | 0 | 1 | 0 | 0 | 0 | 0 | 0 | 15 | 0 | 0 | 0 | 0 | 0 |
| EXAMPLE B19 | 15 | 0 | 0 | 0 | 0 | 0 | 0 | 1 | 0 | 0 | 0 | 0 | 15 | 0 | 0 | 0 | 0 | 0 |
| COMPARATIVE EXAMPLE B1 | 0 | 15 | 0 | 0 | 0 | 0 | 0 | 0 | 1 | 0 | 0 | 0 | 15 | 0 | 0 | 0 | 0 | 0 |
| COMPARATIVE EXAMPLE B2 | 0 | 0 | 15 | 0 | 0 | 0 | 0 | 0 | 1 | 0 | 0 | 0 | 15 | 0 | 0 | 0 | 0 | 0 |
| COMPARATIVE EXAMPLE B3 | 15 | 0 | 0 | 0 | 0 | 0 | 0 | 0 | 0 | 0 | 0 | 0 | 0 | 0 | 0 | 0 | 15 | 0 |
| COMPARATIVE EXAMPLE B4 | 15 | 0 | 0 | 0 | 0 | 0 | 0 | 0 | 0 | 0 | 0 | 0 | 0 | 0 | 0 | 0 | 0 | 0 |
| COMPARATIVE EXAMPLE B5 | 15 | 0 | 0 | 0 | 0 | 0 | 0 | 0 | 0 | 0 | 0 | 0 | 0 | 0 | 0 | 0 | 15 | 0 |
| COMPARATIVE EXAMPLE B6 | 15 | 0 | 0 | 0 | 0 | 0 | 0 | 0 | 2 | 0 | 0 | 0 | 0 | 0 | 0 | 0 | 0 | 0 |

| | BLENDING AMOUNT (PARTS BY MASS) | | | | | | | | | |
|---|---|---|---|---|---|---|---|---|---|---|
| | OTHER COMPONENTS | | SOLVENTS OTHER THAN WATER | | SURFACTANT | | PURIFIED WATER | | | |
| | A1' | B1' | Gly | PG | BYK 348 | EXP 4300 | | XA/XD | XB/XD | XA/XB |
| EXAMPLE B1 | 0 | 0 | 10 | 5 | 1 | 0 | 53 | 0.07 | 1.00 | 0.07 |
| EXAMPLE B2 | 0 | 0 | 10 | 5 | 1 | 0 | 53 | 0.07 | 1.00 | 0.07 |
| EXAMPLE B3 | 0 | 0 | 5 | 5 | 1 | 0 | 43 | 0.03 | 0.50 | 0.07 |
| EXAMPLE B4 | 0 | 0 | 7.5 | 5 | 1 | 0 | 49.5 | 0.10 | 0.75 | 0.13 |
| EXAMPLE B5 | 0 | 0 | 5 | 5 | 1 | 0 | 43 | 0.07 | 2.00 | 0.03 |
| EXAMPLE B6 | 0 | 0 | 7.5 | 5 | 1 | 0 | 50.5 | 0.07 | 1.33 | 0.05 |
| EXAMPLE B7 | 0 | 0 | 12.5 | 5 | 0 | 1 | 48.5 | 0.20 | 1.00 | 0.20 |
| EXAMPLE B8 | 0 | 0 | 12.5 | 5 | 0 | 1 | 49.5 | 0.13 | 1.00 | 0.13 |
| EXAMPLE B9 | 0 | 0 | 20 | 5 | 1 | 0 | 51.5 | 1.50 | 2.00 | 0.75 |
| EXAMPLE B10 | 0 | 0 | 7.5 | 5 | 1 | 0 | 51 | 0.03 | 0.75 | 0.03 |
| EXAMPLE B11 | 0 | 0 | 10 | 5 | 1 | 0 | 51 | 0.10 | 2.20 | 0.05 |
| EXAMPLE B12 | 0 | 0 | 7.5 | 5 | 0 | 1 | 60.5 | 0.05 | 0.25 | 0.20 |
| EXAMPLE B13 | 0 | 0 | 10 | 5 | 0 | 1 | 53 | 0.67 | 0.40 | 1.67 |
| EXAMPLE B14 | 0 | 0 | 5 | 5 | 1 | 0 | 53.75 | 0.02 | 1.33 | 0.01 |
| EXAMPLE B15 | 0 | 0 | 10 | 5 | 1 | 0 | 53 | 0.07 | 1.00 | 0.07 |
| EXAMPLE B16 | 0 | 0 | 0 | 0 | 0 | 0 | 68 | 0.13 | 1.00 | 0.13 |
| EXAMPLE B17 | 0 | 0 | 10 | 5 | 1 | 0 | 53 | 0.07 | 1.00 | 0.07 |
| EXAMPLE B18 | 0 | 0 | 10 | 5 | 1 | 0 | 53 | 0.07 | 1.00 | 0.07 |
| EXAMPLE B19 | 0 | 0 | 10 | 5 | 1 | 0 | 53 | 0.07 | 1.00 | 0.07 |
| COMPARATIVE EXAMPLE B1 | 0 | 0 | 10 | 5 | 1 | 0 | 53 | — | — | 0.07 |
| COMPARATIVE EXAMPLE B2 | 0 | 0 | 10 | 5 | 1 | 0 | 53 | — | — | 0.07 |
| COMPARATIVE EXAMPLE B3 | 0 | 0 | 10 | 5 | 1 | 0 | 54 | 0.00 | 1.00 | 0.00 |
| COMPARATIVE EXAMPLE B4 | 0 | 15 | 10 | 5 | 1 | 0 | 54 | 0.00 | 0.00 | — |
| COMPARATIVE EXAMPLE B5 | 1 | 0 | 10 | 5 | 1 | 0 | 53 | 0.00 | 1.00 | 0.00 |

TABLE 5-continued

| | | | | | | | | | | |
|---|---|---|---|---|---|---|---|---|---|---|
| COMPARATIVE EXAMPLE B6 | 0 | 0 | 10 | 5 | 1 | 0 | 67 | 0.13 | 0.00 | — |

4. Evaluation of Ink-Jet Ink 4-1. Change in Particle Diameter

After the average particle diameter of the disperse dye immediately after the production and the average particle diameter of the disperse dye which was contained in a predetermined ink container and then left for one week in an environment at 60° C. were obtained from the ink-jet ink of each of Examples and Comparative Examples, from the values thus obtained, the rate of change in the average particle diameter of the disperse dye which was left for one week in an environment at 60° C. to the average particle diameter of the disperse dye immediately after the production was obtained, and evaluation was performed in accordance with the following criteria. In addition, for the measurement of the average particle diameter, a Microtrac UPA (manufactured by Nikkiso Co., Ltd.) was used. It can be said that as the rate of change in the average particle diameter is increased, the storage stability is degraded. C or more was regarded as a preferable level.

A: Rate of change in average particle diameter of less than 5%.
B: Rate of change in average particle diameter of 5% to less than 10%.
C: Rate of change in average particle diameter of 10% to less than 15%.
D: Rate of change in average particle diameter of 15% to less than 20%.
E: Rate of change in average particle diameter of 20% or more.

4-2. Change in Viscosity

After the viscosity of the ink-jet ink immediately after the production and the viscosity of the ink-jet ink which was contained in a predetermined ink container and then left for one week in an environment at 60° C. were obtained from each of Examples and Comparative Examples, from the values thus obtained, the rate of change in the viscosity of the ink-jet ink which was left for one week in an environment at 60° C. to the viscosity of the ink-jet ink immediately after the production was obtained, and evaluation was performed in accordance with the following criteria. In addition, the viscosity was measured at 25° C. using a viscoelastic tester MCR-300 (manufactured by Pysica), in such a way that the shear rate was increased from 10 $[s^{-1}]$ to 1,000 $[s^{-1}]$, and a viscosity at a shear rate of 200 was read. It can be said that as the rate of change in the viscosity is increased, the storage stability is degraded. C or more was regarded as a preferable level.

A: Rate of change in viscosity of less than 2%.
B: Rate of change in viscosity of 2% to less than 5%.
C: Rate of change in viscosity of 5% to less than 10%.
D: Rate of change in viscosity of 10% to less than 15%.
E: Rate of change in viscosity of 15% or more.

4-3. Generation of Foreign Materials

The ink-jet ink of each of Examples and Comparative Examples in an amount of 10 mL was received in a predetermined glass bottle so as to form a gas-liquid interface and was then left for five days in an environment at 60° C. Subsequently, after the ink-jet ink was filtrated by a metal mesh filter having an opening diameter of 10 μm, the number of solid materials remaining on the metal mesh filer per square millimeter was counted, and evaluation was performed in accordance with the following criteria. It can be said that as the amount of foreign materials thus generated is increased, the storage stability is degraded. C or more was regarded as a preferable level.

A: The number of solid materials per square millimeter is less than 5.
B: The number of solid materials per square millimeter is 5 to less than 10.
C: The number of solid materials per square millimeter is 10 to less than 30.
D: The number of solid materials per square millimeter is 30 to less than 50.
E: The number of solid materials per square millimeter is 50 or more.

4-4. Ejection Stability by Ink Jet Method

The ink-jet ink of each of Examples and Comparative Examples was filled in a predetermined ink container and was then left for five days in an environment at 60° C.

Subsequently, after the container described above was fitted to a recording apparatus PX-H6000 (manufactured by Seiko Epson Corporation), the ink-jet ink was ejected, so that a solid pattern was adhered to TRANSJET Classic (manufactured by Cham Paper) functioning as an intermediate transfer medium at a recording resolution of 1,440×720 dpi. In addition, the operation environment of the recording apparatus was set to a temperature of 40° C. and a relative humidity of 20%.

The number of missing nozzles was investigated when the solid pattern was formed on 30 intermediate transfer media, and evaluation was performed in accordance with the following criteria. It can be said that as the number of missing nozzles is increased, the ejection stability is degraded. C or more was regarded as a preferable level.

A: The number of missing nozzles is zero.
B: The number of missing nozzles is 1 to 9.
C: The number of missing nozzles is 10 to 19.
D: The number of missing nozzles is 20 to 29.
E: The number of missing nozzles is 30 or more.

In addition, the ink container of PX-H6000 manufactured by Seiko Epson Corporation has an ink charge port through which the aqueous ink jet composition can be replenished and is opened to the air when the ink container is fitted to the recording apparatus in a ready to use state.

4-5. Coloring Property

After one side of the 30th intermediate transfer medium to which the ink-jet ink was adhered in the above 4-4 on which the aqueous ink jet composition was adhered was closely brought into contact with a cloth (100% of a polyester, Amina, manufactured by Toray Industries, Inc.) which was a white recording medium, and in the state described above, by using a heat press machine (TP-608M, manufactured by Taiyo Seiki Co., Ltd.), sublimation transfer was performed by heating at 180° C. for 60 seconds, so that a recorded matter was obtained.

Evaluation of the coloring property of the recorded matter thus obtained was performed. In particular, after the optical density (OD) value of the recorded matter thus obtained was measured using a colorimeter (Gretag Macbeth Spectrolino, manufactured by X-Rite), evaluation was performed in accordance with the following criteria. It can be said that as the OD value is decreased, the coloring property is degraded. B or more was regarded as a preferable level.
A: OD value of 1.50 or more.
B: OD value of 1.45 to less than 1.50.
C: OD value of 1.40 to less than 1.45.
D: OD value of 1.35 to less than 1.40.
E: OD value of less than 1.35.

Those results are collectively shown in Table 6.

TABLE 6

| | CHANGE IN PARTICLE DIAMETER | CHANGE IN VISCOSITY | GENERATION OF FOREIGN MATERIALS | EJECTION STABILITY | COLORING PROPERTY |
|---|---|---|---|---|---|
| EXAMPLE B1 | A | A | A | A | A |
| EXAMPLE B2 | B | A | A | A | A |
| EXAMPLE B3 | C | B | B | B | A |
| EXAMPLE B4 | B | B | B | B | A |
| EXAMPLE B5 | C | C | B | B | A |
| EXAMPLE B6 | C | B | B | B | A |
| EXAMPLE B7 | C | C | B | C | A |
| EXAMPLE B8 | C | C | B | B | A |
| EXAMPLE B9 | C | B | B | B | A |
| EXAMPLE B10 | C | B | B | B | A |
| EXAMPLE B11 | C | B | B | B | A |
| EXAMPLE B12 | C | C | C | C | A |
| EXAMPLE B13 | C | C | C | C | A |
| EXAMPLE B14 | C | C | B | C | A |
| EXAMPLE B15 | B | B | B | B | A |
| EXAMPLE B16 | C | B | B | B | A |
| EXAMPLE B17 | B | B | B | B | A |
| EXAMPLE B18 | C | B | C | B | A |
| EXAMPLE B19 | C | C | C | C | A |
| COMPARATIVE EXAMPLE B1 | E | D | E | E | A |
| COMPARATIVE EXAMPLE B2 | E | D | E | E | A |
| COMPARATIVE EXAMPLE B3 | D | D | D | D | A |
| COMPARATIVE EXAMPLE B4 | E | D | E | D | A |
| COMPARATIVE EXAMPLE B5 | E | D | D | D | A |
| COMPARATIVE EXAMPLE B6 | E | E | E | E | C |

As apparent from Table 6, according to the present disclosure, excellent results are obtained. On the other hand, in Comparative Examples, satisfactory results cannot be obtained.

What is claimed is:
1. An aqueous ink jet composition comprising:
C.I. Disperse Red 364;
a material A which is at least one compound selected from the group consisting of a compound represented by the following formula (1), a compound represented by the following formula (2), and an ethylene oxide adduct of tristyrylphenol; and
an anionic dispersant, wherein

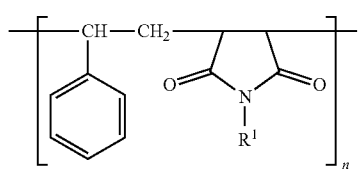

(1)

in the formula (1), $R^1$ represents a hydrocarbon group having six carbon atoms or less or $-(CH_2)_m-NR^8R^9$, m represents an integer of six or less, and $R^8$ and $R^9$ each independently represent a hydrogen atom or a hydrocarbon group having six carbon atoms or less; and n represents an integer of one or more, and

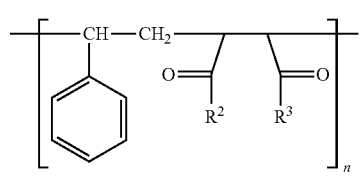

(2)

in the formula (2), one of $R^2$ and $R^3$ represents an —OH group, the other represents $-NR^4R^5$, and $R^4$ and $R^5$ each independently represent a hydrogen atom or a hydrocarbon group having six carbon atoms or less; and n represents an integer of one or more.

2. The aqueous ink jet composition according to claim 1, wherein
the anionic dispersant is at least one of a compound represented by the following formula (3), a sodium salt of a naphthalenesulfonic acid formalin condensate, and a ligninsulfonic acid, wherein

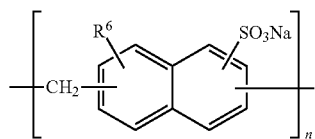

(3)

in the formula (3), $R^6$ represents a hydrocarbon group having four carbon atoms or less, and n represents an integer of one or more.

3. The aqueous ink jet composition according to claim 2, wherein
the anionic dispersant further contains a polyoxyethylene alkyl ether sulfate or a polyoxyethylene alkenyl ether sulfate.

4. The aqueous ink jet composition according to claim 1, further comprising an indigo compound having a sulfo group.

5. The aqueous ink jet composition according to claim 4, wherein
the indigo compound having a sulfo group is C.I. Acid Blue 76.

6. The aqueous ink jet composition according to claim 1, wherein
the content of C.I. Disperse Red 364 is 0.1 to 30 percent by mass.

7. The aqueous ink jet composition according to claim 1, wherein
the content of the material A is 0.05 to 3.0 percent by mass.

8. The aqueous ink jet composition according to claim 1, wherein
the content of the anionic dispersant is 0.1 to 40 percent by mass.

9. The aqueous ink jet composition according to claim 1, wherein
$0.01 \leq XA/XD \leq 1.5$, the content of C.I. Disperse Red 364 and the content of the material A being represented by XD and XA, respectively, in percent by mass.

10. The aqueous ink jet composition according to claim 1, wherein
$0.2 \leq XB/XD \leq 2.0$, the content of C.I. Disperse Red 364 and the content of the anionic dispersant being represented by XD and XB, respectively, in percent by mass.

11. The aqueous ink jet composition according to claim 1, wherein
$0.01 \leq XA/XB \leq 2.0$, the content of the material A and the content of the anionic dispersant being represented by XA and XB, respectively, in percent by mass.

12. The aqueous ink jet composition according to claim 1, wherein
the anionic dispersant has a weight average molecular weight of 1,000 to 20,000.

* * * * *